United States Patent Office 3,360,590
Patented Dec. 26, 1967

3,360,590
EASILY PROCESSED SYNTHETIC RESINS
Raimond Liepins, Northfield, Ohio, assignor to The B. F. Goodrich Company, New York, N.Y., a corporation of New York
No Drawing. Filed June 18, 1962, Ser. No. 202,967
8 Claims. (Cl. 260—884)

The present invention relates to easily processed chlorinated synthetic resins and is more particularly concerned with easily processed synthetic resins comprising an overpolymer of a vinyl aromatic monomer on an afterchlorinated polyvinyl chloride resin and to the novel method for preparing said overpolymer.

The compositions embodied in the present invention are chlorinated polyvinyl chloride resins including those described and claimed in U.S. Patent No. 2,996,489, Patent No. 3,100,762 and the applications for patents set forth below, which chlorinated resins have been subjected to an overpolymerization with a vinyl aromatic monomer or mixtures of a vinyl aromatic monomer and at least one other polymerizable monomer. Surprisingly, the overpolymerized compositions embodied herein are superior in processability, impact resistance and tensile strength, for instance, when compared with identical chemical compositions resulting from physical blends of polymers.

Chlorinated polyvinyl chloride resins which are well known in the art are broadly within the scope of the present invention. It is preferred, however, to use the more stable, higher softening chlorinated polyvinyl chloride resins which are more fully described in U.S. Patent No. 2,996,489, and in the copending U.S. patent application of Joseph C. Shockney, Serial No. 101,654, filed April 10, 1961, now U.S. Patent No. 3,100,762, the applications of George Gateff and Howard H. Bowerman, Serial No. 184,535, filed Apr. 2, 1962, now U.S. Patent No. 3,167,-535 and Serial No. 199,639, filed June 4, 1962, now abandoned. The preferred chlorinated polyvinyl chloride resins, which are described in the foregoing patents and applications, are those having ASTM densities of from 1.43 to 1.65 and being further characterized in that the resins, without added stabilizers, possess a heat stability such that a pressed film thereof does not turn black when exposed for 10 minutes in air to a temperature of 375° F.

Easily processed compositions can be prepared for instance from 100 parts by weight of an overpolymer of the present invention and from 2 to less than 10 parts by weight of a homogeneously chlorinated polyethylene as described in the copending U.S. patent application of Garland B. Jennings and George J. Kliner, Serial No. 107,-929, filed May 3, 1961, now U.S. Patent No. 3,299,182.

The vinyl aromatic monomers useful in the preparation of the overpolymers embodied herein are preferably monovinyl aromatic monomers having from 8 to 20 carbon atoms such as styrene, alpha-methyl styrene, the vinyl toluenes, the vinyl xylenes, the vinyl naphthalenes, the alpha-methyl vinyl naphthalenes, and the like. Most preferred is styrene.

The other monomers useful in conjunction with the vinyl aromatic monomer in the preparation of the overpolymers embodied herein include the vinyl halides such as vinyl chloride, chloro trifluoroethylene, dichloro difluoro ethylene and the like; the acrylate esters, the methacrylate esters, the vinyl esters, maleate esters, fumarate esters, and others. Most preferred are monomers having the structure

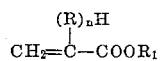

wherein R is an alkylene radical having from 1 to 4 carbon atoms, $n$ is a whole number of from 0 to 1 and $R_1$ is an alkyl radical having from 1 to 12 carbon atoms.

The preferred compositions of the present invention are those containing from about 1 to 10% by weight of the overpolymerized vinyl aromatic monomer or vinyl aromatic monomer—other monomer mixture.

The preferred method for preparing the overpolymers of the present invention comprises mixing the monomers, a polymerization initiator and substantially dry, particulate chlorinated polyvinyl chloride resin and maintaining said mixture in an inert atmosphere at a temperature suitable for causing the polymerization of the monomers. Because the preferred method for overpolymerization is carried out in the absence of solvents or diluents, the final product may be isolated in the dry, granular form.

The polymerization process of the present invention may be carried out at temperatures of from 0° C. and lower to 100° C. and higher although it is preferred to conduct the polymerization with a suitable initiator at a temperature in the range of from about 25° C. to 90° C.

The polymerization initiators useful in the overpolymerization process embodied herein may be one or more of the well-known peroxy compounds including organic and inorganic derivatives of hydrogen peroxide, hydrogen peroxide itself, azo or "redox" polymerization initiators.

The term "overpolymer" as used herein simply designates the method of preparation. It is not known with certainty what proportion, if any, of the overpolymers of this invention is "graft" polymer. It does appear, however, from fractionation studies that at least 90% of the vinyl aromatic homo- or copolymer can be separated from the overpolymer and thus would appear not to be "grafted."

In the following illustrative examples the amounts of ingredients are given in parts by weight unless otherwise indicated.

Example I (A) Ten parts by weight of a mixture of 3:1 by weight of styrene:n-butyl methacrylate containing 0.2 part of para-menthane hydroperoxide were added under nitrogen to 100 parts of a porous chlorinated polyvinyl chloride having a density of 1.570 g. per cc. at 25° C. The porous chlorinated polyvinyl chloride was prepared in a waterchloroform slurry in the presence of light at a temperature below 65° C. as described in U.S. Patent No. 2,996,489. The mixture was agitated until all of the monomer mixture was absorbed and a uniformly moist powder was obtained. The mixture was then heated to 80° C., was agitated gently and maintained at this temperature for about 7 hours by which time at least 62% of the monomers had polymerized. The extent of polymerization was determined by chlorine analysis before and after the polymerization. The resulting powder was washed with 500 parts of methanol, filtered, washed again with methanol and dried in a vacuum oven at 60° C. for 16 hours. The dried powdery product was then roll-mixed with 3 parts of a mixed barium-cadmium salt of a fatty acid mixture (Ferro 1827), 2 parts of calcium stearate and 5 parts of titanium dioxide. To the resulting mixture were also added 7 parts of a homogeneously chlorinated high density polyethylene containing about 35% bound chlorine (prepared by the procedure described and claimed in the copending U.S. patent application of M. Peter Dreyfuss and Floyd L. Ramp, Serial No. 106,477, filed May 1, 1961, now abandoned) and the formulation was then mixed in a Banbury mixer for 3 minutes at 149° C. The fluxed material was then transferred from the Banbury to a 4 inch roll-mill operated at a roll temperature of 188° C., and was milled for 3 minutes. The milled stock was allowed to cool and was then granulated. The granulated stock was then passed through a one-inch screw type plastic extruder having a barrel temperature of 170° C. and a die temperature of 195° C. and employing screw speeds of from 44 to 60 r.p.m. The extrusion rate was determined by weighing 10 second samples of the extrudate. The extrusion tests and other physical properties are given below.

(B) The procedure described in A above was repeated except that the overpolymerization step was omitted and a 3:1 by weight copolymer of stryrene:n-butyl methacrylate copolymer prepared by polymerization for 7 hours at 80° C. in the presence of p-menthane hydroperoxide was mixed with the other ingredients in the Banbury mixer. The results of the extrusion tests and other physical properties are given below:

|  | A | B |
|---|---|---|
| Percent Copolymer present | 6.2 | 6.2 |
| Extrusion rate at 60 r.p.m., g./min | 87 | 74 |
| ASTM Heat distortion temp., ° C | 103 | 104 |
| Izod impact (foot pounds) | 8.6 | 2.7 |
| Tensile strength (absolute value) | 21 | 17 |

*Example II*

Results similar to those described in Example I were obtained by employing 7.2% by weight of a weight ratio of 3:1 styrene:ethyl acrylate in the overpolymerization step.

*Example III*

Results similar to those described in Example I were obtained employing 6.3, 6.6, 7.1, 7.3 and 8.3% by weight of a 3:1 weight ratio styrene:2-ethyl hexyl acrylate monomer mixture in the overpolymerization step. The overpolymerization reaction was found to proceed nicely in a Banbury mixer in an atmosphere of carbon dioxide at a temperature of from 63 to 124° C. for from 9 to 30 minutes employing 3:1 by weight monomer mixture of styrene:2-ethyl hexyl acrylate.

*Example IV*

Results similar to those described in Example I were obtained by employing 5.9% by weight of a 5:1 and a 7:1 weight ratio of styrene:2-ethyl hexyl acrylate and 5.6% by weight of a 1:2 weight ratio of styrene:2-ethyl hexyl acrylate monomer mixture in the overpolymerization step.

*Example V*

Results similar to those described in Example I were obtained by employing from 5.9 to 7.8% by weight of a 3:1 weight ratio of styrene:methyl methacrylate, styrene: n-butyl methacrylate, styrene:hexyl methacrylate, styrene: t-butyl methacrylate and styrene: pentachloro phenyl methacrylate monomer mixture in the overpolymerization step.

I claim:

1. The polymeric product obtained by the process of polymerizing from about 1 part to about 9 parts by weight of a monomer mixture of a vinyl aromatic monomer having from 8 to 20 carbon atoms and at least one other polymerizable monomer having the structure

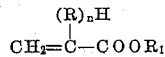

wherein R is an alkylene radical having from 1 to 4 carbon atoms, $n$ is a whole number of from 0 to 1 and $R_1$ is an alkyl radical having from 1 to 12 carbon atoms, the weight ratio of the vinyl aromatic monomer to the other polymerizable monomer in the monomer mixture being within the range of about 1:2 to about 7:1, said monomer mixture containing a free-radical-producing catalytic agent and in admixture with from about 91 to about 99 parts by weight of post-chlorinated polyvinyl chloride resin in particulate form, said resin having an ASTM density of from 1.43 to 1.65 and a high heat stability such that it is not degraded when heated in air at 375° F. for at least 10 minutes, the amounts of the monomer mixture and chlorinated polyvinyl chloride resin combined totaling 100 parts.

2. The product of claim 1 wherein the vinyl aromatic monomer is styrene and the other polymerizable monomer is n-butyl methacrylate.

3. The product of claim 1 wherein the vinyl aromatic monomer is styrene and the other polymerizable monomer is ethyl acrylate.

4. The product of claim 1 wherein the vinyl aromatic monomer is styrene and the other polymerizable monomer is 2-ethyl hexyl acrylate.

5. The product of claim 1 wherein the vinyl aromatic monomer is styrene and the other polymerizable monomer is methyl methacrylate.

6. The product of claim 1 wherein the vinyl aromatic monomer is styrene and the other polymerizable monomer is t-butyl methacrylate.

7. The product of claim 1 wherein the vinyl aromatic monomer is styrene and the other polymerizable monomer is hexyl methacrylate.

8. The method which comprises polymerizing in an inert atmosphere in the absence of diluent medium from about 1 part to about 9 parts by weight of a monomer mixture of a vinyl aromatic monomer having from 8 to 20 carbon atoms and at least one other polymerizable monomer having the structure

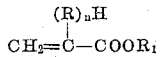

wherein R is an alkylene radical having from 1 to 4 carbon atoms, $n$ is a whole number of from 0 to 1 and $R_1$ is an alkyl radical having from 1 to 12 carbon atoms, the weight ratio of the vinyl aromatic monomer to the other polymerizable monomer in the monomer mixture being within the range of about 1:2 to about 7:1, said monomer mixture containing a free-radical-producing catalytic agent and in admixture with from about 91 to about 99 parts by weight of post-chlorinated polyvinyl chloride resin in particulate form, said resin having an ASTM density of from 1.43 to 1.65 and a high heat stability such that it is not degraded when heated in air at 375° F. for at least 10 minutes, the amounts of the monomer mixture and chlorinated polyvinyl chloride resin combined totaling 100 parts.

References Cited

UNITED STATES PATENTS

| 2,841,569 | 7/1958 | Rugg et al. | 260—897 |
| 3,012,001 | 12/1961 | Smith | 260—884 |
| 2,230,000 | 1/1941 | Hauffe et al. | 260—899 |
| 3,167,598 | 1/1965 | Heaps et al. | 260—879 |

OTHER REFERENCES

Schildknecht, Vinyl and Related Polymers, John Wiley and Sons, 1952 ed., pages 412–413.

MURRAY TILLMAN, *Primary Examiner.*

JAMES A. SEIDLECK, *Examiner.*

N. W. SHUST, J. WHITE, *Assistant Examiners.*